(12) United States Patent
Lear et al.

(10) Patent No.: US 7,249,374 B1
(45) Date of Patent: Jul. 24, 2007

(54) METHOD AND APPARATUS FOR SELECTIVELY ENFORCING NETWORK SECURITY POLICIES USING GROUP IDENTIFIERS

(75) Inventors: Eliot Lear, San Francisco, CA (US); Christopher M. Lonvick, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1249 days.

(21) Appl. No.: 09/767,284

(22) Filed: Jan. 22, 2001

(51) Int. Cl.
*G06F 7/04* (2006.01)

(52) U.S. Cl. .................... 726/6; 713/159; 713/100; 709/230; 709/203; 709/236

(58) Field of Classification Search ............... 713/201, 713/182, 200, 159, 100; 726/13, 22, 24, 726/4–6; 709/230, 236, 203
See application file for complete search history.

(56) References Cited

U.S. PATENT DOCUMENTS

| 6,182,226 | B1 * | 1/2001 | Reid et al. .................. 713/201 |
| 6,587,455 | B1 * | 7/2003 | Ray et al. ................... 370/352 |
| 6,823,462 | B1 * | 11/2004 | Cheng et al. ............... 713/201 |

OTHER PUBLICATIONS

Stevens, TCP/IP Illustrated, 1994, Addison-Wesley, vol. 1, pp. 187-190.*
Stewart, R. R. Aggregate server Access Protocol (ASAP), Nov. 15, 2000.*
J. Saltzer et al., "On the Naming and Binding of Network Destinations," Aug. 1993, Network Working Group, Request for Comments: 1498, pp. 1-10.
J. H. Saltzer, "Naming and Binding of Objects," Chapter 3.A., 1978, Lecture Notes in Computer Science, 60, "Operating Systems—An Advanced Course," R. Bayer, R. M. Graham, and G. Seegmüller (eds), Springer-Verlag, pp. 1-105.
Hugh Mahon, et al., "Requirements for a Policy Management System," Nov. 2000, pp. 1-20.

(Continued)

*Primary Examiner*—Kim Vu
*Assistant Examiner*—Paula Klimach
(74) *Attorney, Agent, or Firm*—Hickman Palermo Truong & Becker LLP

(57) ABSTRACT

A method and apparatus for selectively enforcing network security policy using group identifiers are disclosed. One or more access controls are created and stored in a policy enforcement point that controls access to the network, wherein each of the access controls specifies that a named group is allowed access to a particular resource. A binding of a network address to an authenticated user of a client, for which the policy enforcement point controls access to the network, is created and stored. The named group is updated to include the network address of the authenticated user at the policy enforcement point. A packet flow originating from the network address is permitted to pass from the policy enforcement point into the network only if the network address is in the named group identified in one of the access controls that specifies that the named group is allowed access to the network. Accordingly, network security may be implemented in the form of abstract groups that include specific network addresses; as a result, users may be allowed or denied access to network addresses by updating membership of the groups to include or delete the network addresses of the users, rather than by creating or deleting access controls that specifically identify the users.

18 Claims, 7 Drawing Sheets

OTHER PUBLICATIONS

A. Westerinen, et al., "Terminology," Apr. 2001, pp. 1-20.

B. Moore, et al., "Policy Core Information Model—Version 1 Specification," Feb. 2001, pp. 1-64.

"Policy Framework (policy)," pp. 1-4, http://www.ietf.org/html.charters/policy-charter.html.

"CiscoWorks2000, User Registration Tool 2.0," Data Sheet, 2001, pp. 1-5.

"CiscoWorks2000, User Registration Tool 2.0," Q&A, 2001, pp. 1-7.

"CiscoWorks2000, User Registration Tool 2.0," Product Bulletin No. 1256, 2001, pp. 1-3.

"The CiscoWorks200 User Registration Tool," Data Sheet, 1998, pp. 1-7.

* cited by examiner

METHOD AND APPARATUS FOR SELECTIVELY ENFORCING NETWORK SECURITY POLICIES USING GROUP IDENTIFIERS

FIELD OF INVENTION

The present invention generally relates to enforcing security in a network. The invention relates more specifically to a method and apparatus for selectively enforcing network security policy using group identifiers.

BACKGROUND OF THE INVENTION

In securing a network it is desirable is to implement a type of security throughout the infrastructure based upon the identity of a user and an association of that user to the network address that he is using. In the past, this has been unworkable for various reasons. Accordingly, there is a need for a scalable approach for associating data flows to individuals and groups at network policy enforcement points.

Generally, there are four ways to define and implement an access security policy: Closed, Restrictive, Permissive, and Open. Under a Closed policy, all prospective users are denied access to the network. This policy is best implemented by eliminating the network connection of each prospective user, and is not normally practical to implement. In a Restrictive policy, a network denies access to all except that which is explicitly permitted. Under a Permissive policy, a network permits access to all except that which is explicitly denied. Under an Open policy, a network permits access to all parties. This is usually not implemented except in totally trusted domains.

For acceptable access control, a security policy must be consistently enforced by all devices that are capable of enforcing the policy and that are in the network. In known approaches, such devices can implement a particular policy using three general mechanisms. In a first approach, static access controls without consideration of user or device mobility are implemented. In a second approach, dynamic access controls with user or device mobility are provided. In a third approach, a software facility such as the Cisco User Registration Tool ("URT") is used in combination with some dynamic access controls.

Generally, the first approach simply involves the placement of access control lists ("ACLs") on network routers to limit access to or from stationary hosts throughout the enterprise or any part of the network. This does not require any policy distribution protocol or mechanism and it mandates that authorized users always use the same machine, or are limited to always using a machine within a specified security zone. The ACLs can be placed on the policy enforcement point ("PEP") nearest to the machine that can restrict access to provide coarse or fine-grained control. This approach has limited applicability; although ACLs may be placed to limit access to destinations, the approach is inflexible because users and their machines normally move around within an enterprise.

The second approach, providing dynamic access controls with mobility, may involve implementing the policy model that is now under development by the Internet Engineering Task Force (IETF), but may have a scalability problem to be effective. In using the second approach, a Policy Decision Point (PDP) transmits to policy enforcement point (PEP) a static policy, such as "User <Bill> may access <Server 1>". The PEP then receives user authentication credentials, either through some type of userid/password information, or a similar mechanism. A network address binding resolution ("NABR") process then would statically resolve names on a one-time basis, each time the PDP updates the PEP.

Two sub-approaches are known for carrying out the second approach. In the first sub-approach, a small process effort is required but the approach is relatively inefficient. The second sub-approach is more efficient but may leave coverage holes. Thus, neither sub-approach is fully satisfactory. In both sub-approaches, a simplified policy may be defined in standard terms such as:

User <Bill> may not access <Server 1>

User <Bill> may not access <Server 2>

User <Bill> may access all other resources.

In conventional approaches, such definitions identify <Bill> as either a static IP address, an address mask, or a hostname that is resolved into a static IP address. Such definitions can be structured in either a restrictive or permissive manner. The above example is permissive since it ends with an open rule. It could be inverted to produce a very restrictive policy by explicitly stating only the resources that <Bill> may access and then ending with a rule that denies all else. A permissive policy usually takes fewer access control elements, but may not always cover all cases in a dynamic environment. In a permissive manner, if a new server is added, <Bill> would have immediate access to it until the administrators added it to the list of servers denied to <Bill>. However in a restrictive environment, that server would not be on the list of servers that <Bill> would have access to until the administrators placed it there.

The differences in the two sub-approaches are in the distribution and placement of the controls, as explained below.

In the first sub-approach, the abstract controls may be centralized and applied after the NABR process has bound the user (Bill) with the IP address that Bill is known to be using at that moment. In this sub-approach, no consideration is made to the location within the network of the user (Bill). Since the network is assumed to have more than one router or other point of ingress, such that the network is resilient to failure of any particular router, the policy would have to be distributed to all points that may pass the traffic. In an enterprise network, packets may take any available path and, indeed, will be directed among several paths if load sharing is enabled. If the policy is not enforced upon all paths, then packets may bypass the policy enforcement points. As a result, it is imperative to distribute the ACLs that can enforce the policy to all routers or switches that are acting as PEPs. If they are not, then the policy enforcement will fail and security may be breached.

Thus, the first sub-approach involves significant scalability problems. For example, the ACLs with the network address associated with the specific user must be distributed to all PEPs throughout the network. In a large network, this could add a very significant amount of traffic. Further, the memory required to hold the Access-Control elements for each of these users in a large network would be substantial and may fill all available memory in the PEPs.

In the second sub-approach, if the topology can be ascertained, then a specific policy can be distributed to the point (or points) nearest to the machine that Bill is using in the example above. Ideally, these PEPs define a perimeter around the machine that Bill is using. The distribution of this policy would be limited to fewer PEPs and the memory required would be less for all access controls of the machines within the zone. However, if the topology information is incorrect, or if there are resiliency mechanisms that are not accounted for in the topology, then there may be a coverage hole left that can be exploited.

According to a third approach, the NABR process places Bill into a temporary or restricted local VLAN, with an address provided by a DHCP server of similar facility, and the VLAN is given static access controls that permit access only to a limited set of resources. For example, with Cisco's URT, each group has such a restricted VLAN associated with it. Thus, each network switch that is controlled by URT must allow for a presence of the associated VLAN. As a result, the utility of this approach is limited by the ability of a network to define such VLANs at or carry such VLANs to every point a new user might access them. Coordinating the existence and membership of such VLANs at every network switch becomes complicated. The scalability limitations of this method become particularly apparent when used in networks that are highly geographically diverse or on networks that support broadcast or multicast based applications.

To illustrate problems inherent in the third approach, consider a hypothetical enterprise and the groups that the enterprise may want to have access control over and some of their acceptable uses of the enterprise network. Visitors to the enterprise are allowed Web access to the Internet as well as web access to a selected area of the enterprise's intranet, but nothing else. Contract Employees Type 1 are allowed to access departmental resources, and HR information for Contractors, but have no Web access. Contract Employees Type 2 have departmental services, HR information, and Web access. Exempt employees receive all services, HR information, and full Internet access. Non-exempt employees receive all services, HR information, and limited Internet access. Members of the Engineering department inherit the accesses of the Exempt employees plus receive access to lab networks. HR staff members also inherit the rights of the Exempt employees plus administrative access to HR servers. E-staff members inherit the rights of Exempt employees and also have access to E-staff resources.

The list could include manufacturing, sales, etc. Having each of these groups in a VLAN on a switch (with dynamically add-able IP addresses per port) would waste address space. Care must also be taken to not overextend the broadcast domain as well. In practice, these rules would mean that VLAN-A for the E-staff would have to be on each switch within each broadcast domain (areas separated by routers). The address space for each of these segmented subnets would have a specific static ACL assigned to them. For the address space for E-staff on a specific switch, there would have to be appropriate ACLs to constrain those addresses to follow the security policy.

The application of the static rules adds greatly to the complexity of the administration. There would have to be a VLAN on each switch for each potential person that may enter it from each group. On a switch in a busy location, this may mean that the switch may be fully populated by members of a single group. This would mean that the DHCP range for the E-staff group would be expected to be the same number as the number of ports on the switch. Potentially, then, each group that would be expected to be on the switch may need an address range that covers all ports on the switch. It may be more than that if any switch port is attached to a hub or shared segment. This over-booking of address ranges on a single switch is extremely wasteful of addresses.

Beyond this, the nearest PEP would have to maintain ACLs for each group consistent with the DHCP address range assigned to be used by that group. This will mean that a general coverage ACL may be made for the entire enterprise, but then it must be customized for each group that is expected to use the DHCP address range within that area. This is poor for network administration, but is especially worse for the validation of a security policy.

Still another past approach involves the distribution of policy through an authentication service (e.g. −TACACS+ or RADIUS). In this approach, the policy for each individual user is described in a database or list. When a user authenticates on a specific port or interface of an Access Control Server (ACS—usually a dial-in device), then the policy is downloaded to the device. It contains specific policy controls for that user as associated with that port and the IP address to which it is associated. There is a known security zone for the single entrance point on the dial-in server where the access controls may be positioned.

Still another known past approach involves implementing access controls on multi-user machines. Traditionally, this approach has used individual access controls as well as through the use of groups. For example, in Unix systems, controls are assigned based upon "owner, group, and world". However, in general, this mechanism is exclusively used to control access to files and resources on Unix systems and cannot be effectively used to control access to network resources.

Based on the foregoing, there is a clear need for a scalable approach for associating data flows to individuals and groups at network policy enforcement points.

In particular, there is a need for a way to enforce network security with respect to abstract groups rather than individual users or machines.

SUMMARY OF THE INVENTION

The foregoing needs, and other needs and objects that will become apparent for the following description, are achieved in the present invention, which comprises, in one aspect, a method and apparatus for selectively enforcing network security policy using group identifiers. In one embodiment, the method involves creating and storing one or more access controls in a policy enforcement point that controls access to the network, wherein each of the access controls specifies that a named group is permitted or denied access to a particular resource. A binding of a network address to an authenticated user of a device, for which the policy enforcement point controls access to the network, is received. The named group is updated to include the network address of the authenticated user at the policy enforcement point. A packet flow originating from the network address is permitted to pass from the policy enforcement point into the network only if the network address is in the named group identified in one of the access controls that specifies that the named group is allowed access to the network.

In one feature of this embodiment the steps of creating and storing one or more access controls in a policy enforcement point that controls access to the network comprise the steps of creating and storing one or more definitions of groups in a data store; creating and storing one or more definitions of resources within a data store; and creating and storing one or more access controls at the policy enforcement point, wherein each of the access controls specifies that a named group is allowed access to a particular resource, wherein one of the access controls specifies that all other traffic is denied access to the network.

According to another feature, the method further involves distributing the network address of the authenticated user and information identifying one or more groups of which the authenticated user is a member to all policy enforcement points of a protected network that the user seeks to access, or to all policy enforcement points that define a security zone that encompasses the user.

In another feature, the steps of receiving a binding of a network address to an authenticated user comprise the steps of performing network address binding resolution for the user. In yet another feature, the method further comprises the steps of determining that the user has discontinued use of the client, and deleting the network address to which the user is bound from each named group of each policy enforcement point of the network.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for selectively enforcing network security policy using group identifiers is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 1A:
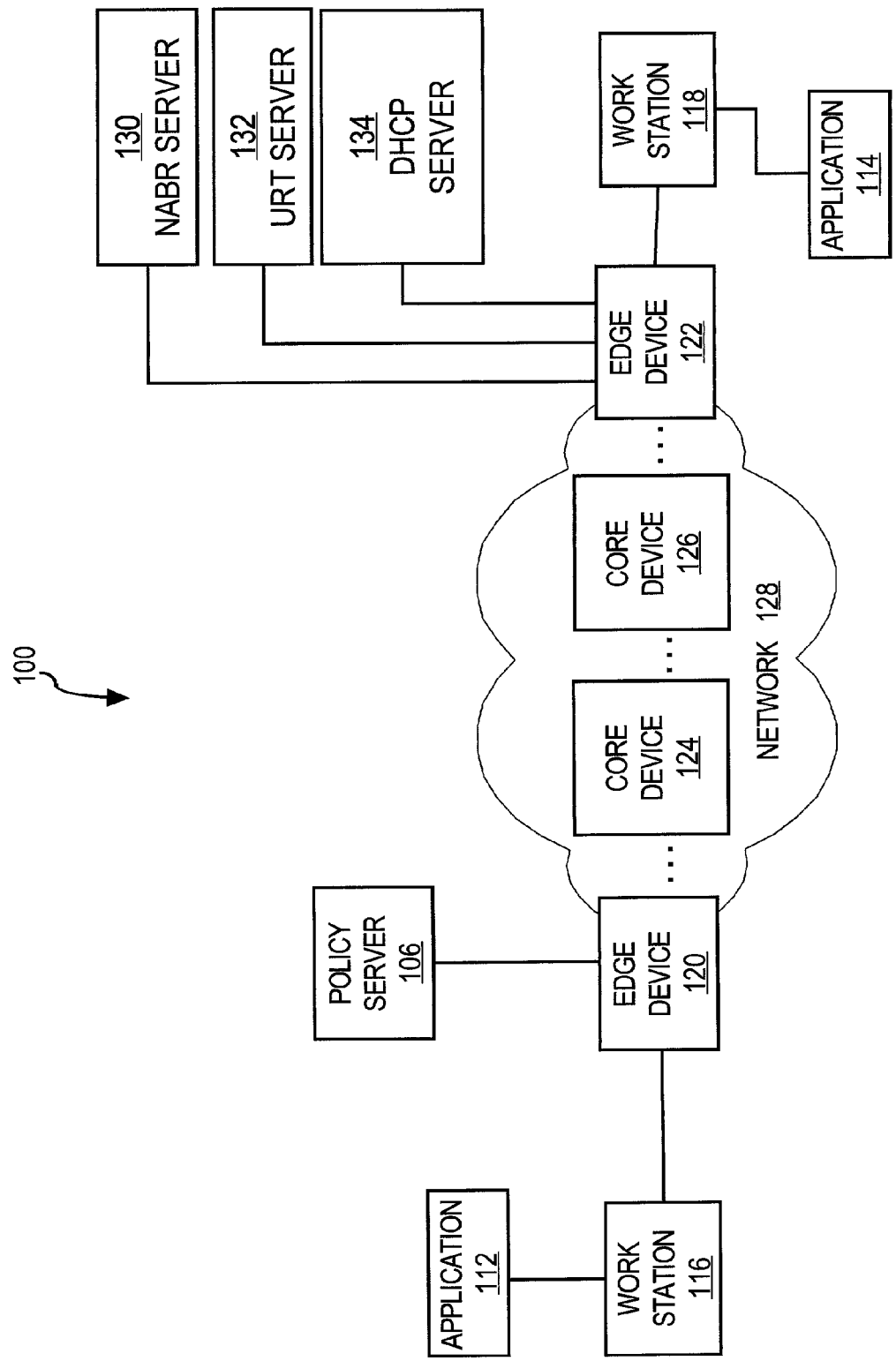
FIG. 1A is a block diagram of a computer network illustrating a structural context in which certain embodiments of the invention may be used.

FIG. 1A is a block diagram of a computer network system 100 that is provided to illustrate a structural context in which certain embodiments of the invention may be used. Generally, system 100 includes one or more network devices 120, 122, 124, 126, application programs 112, 114, a plurality of workstations 116, 118, a quality of service policy server 106, and a core network 128.

Network devices 120, 122 represent edge network devices such as routers, switches, or other similar or equivalent devices that can determine or enforce security policies within network 128. In one embodiment, network devices 120, 122 are routers or switches from Cisco Systems, Inc., San Jose, Calif., and are configured to execute the Cisco Internetworking Operating System (IOS).

Network devices 124, 126 represent internal network devices ("core devices") such as routers, switches, or other similar or equivalent devices that are configured for forwarding packets within network 128 based the color of each packet. In certain embodiments, network devices 124, 126 are configured to execute IOS. Network devices 120, 122 and network devices 124, 126 may represent similar or even identical device types and/or models that are each configured to perform a designated function within system 100.

Workstations 116, 118 may be personal computers, workstations, or other network end stations at which work is done, such as printers, scanners, facsimile machines, etc. In certain embodiments, workstations 116, 118 are network devices, such as bridges, gateways, routers or switches that allow system 100 to connect to another network or system. In certain embodiments, workstations 116, 118 execute one or more applications 112, 114. Applications 112, 114 may represent a variety of different computer applications that execute on workstations 116, 118 respectively and which cause data to be sent and received over network 128.

Network 128 comprises any number of network devices. Network 128 may form part of a LAN or WAN. In one embodiment, network 128 is a packet-switched IP network whereby treatment of packets that flow through network 128 is controlled and managed by policy server 106 and network devices 120, 122, 124, 126.

Policy server 106 is a computer, or a group of hardware or software components or processes that cooperate or execute in one or more computer systems. In one embodiment, policy server 106 can configure network device 120 to control the coloring and forwarding of packets within network 128 for purposes of applying different quality of service treatments to such packets. An example of a commercial product suitable for use as policy server 106 is CiscoAssure QoS Policy Manager 1.0, commercially available from Cisco Systems, Inc.

Edge device 122 is communicatively coupled to a Network Address Binding Resolution (NABR) server 130, User Registration Tool (URT) server 132, and Dynamic Host Configuration Protocol (DHCP) server 134. NABR server 130 is responsible for carrying out network address binding resolution to bind an authenticated user of a workstation, e.g., workstation 118, to a particular static network address such as an IP address. URT server 132 provides user authentication services and may be hosted by edge device 122 or on a separate hardware device. DHCP server 134 is responsible for dynamically assigning network addresses to devices associated with authenticated end users, e.g., for workstation 118. Collectively, edge device 120, core devices 124, 126, network 128, edge device 122, NABR server 130, URT server 132, and DHCP server 134 may form a logical security zone within which processes of the invention may control access to resources. The use of security zones and the interaction of the foregoing elements is described further below.

Although the example embodiment of FIG. 1A shows two (2) workstations 116, 118, one (1) policy servers 106, two (2) edge devices 120, 122, and two (2) core devices 124, 126, in other practical embodiments there may be any number of such elements.

Figure 1B:
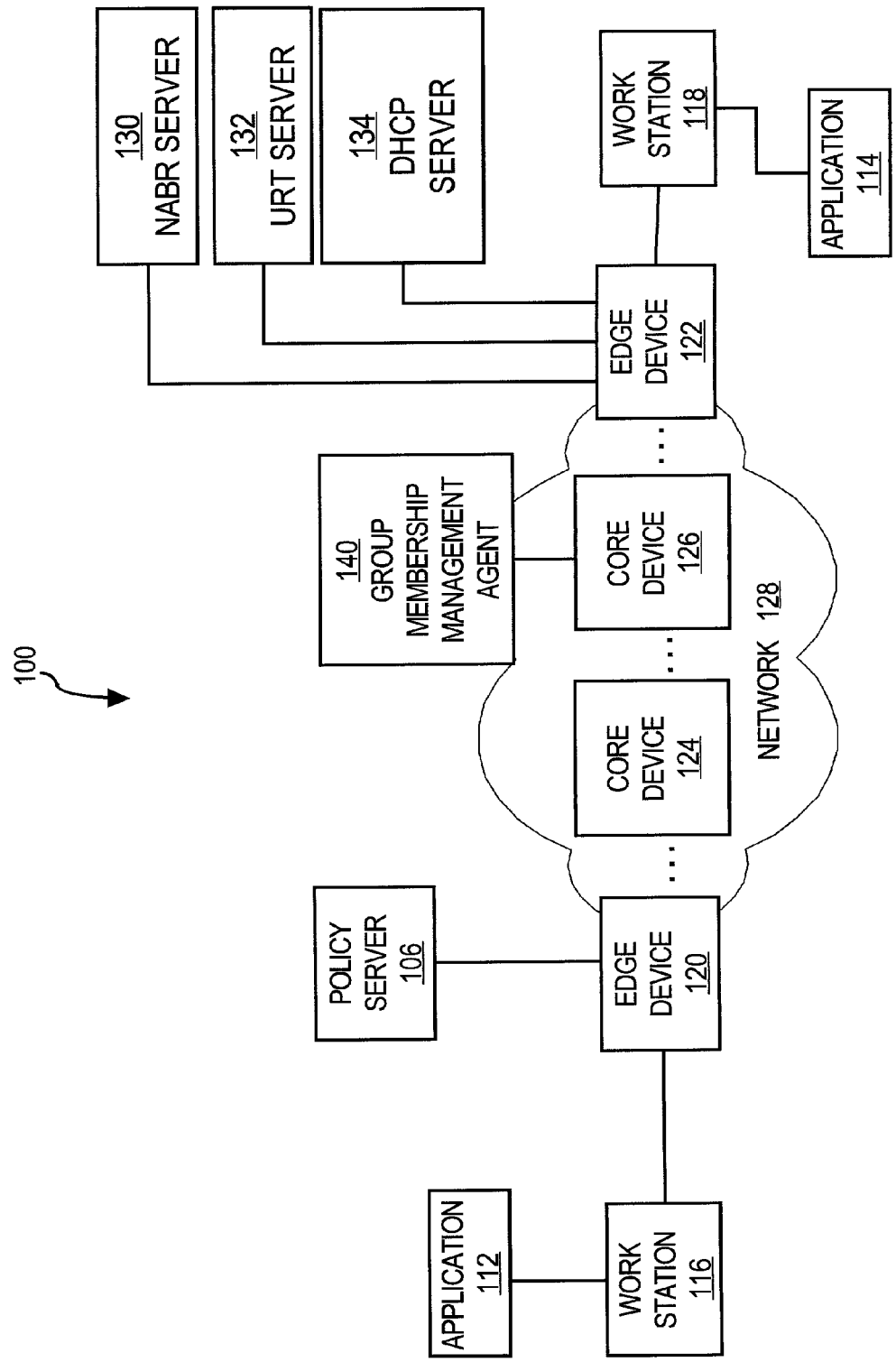
FIG. 1B is a block diagram of a computer network illustrating an alternative structural context in which certain embodiments may be used.

FIG. 1B is a block diagram of a computer network illustrating an alternative structural context in which certain embodiments may be used. In this embodiment, one of the core devices, such as core device 126, executes a group membership management agent 140 under control of IOS or a similar operating system. Group membership management agent 140 is responsible for selectively enforcing network policies using group membership. In still another alternative, policy server 106 has functional responsibility for selectively enforcing network policies using group membership.

Enforcement of Policy Based on Group Membership

Figure 2:
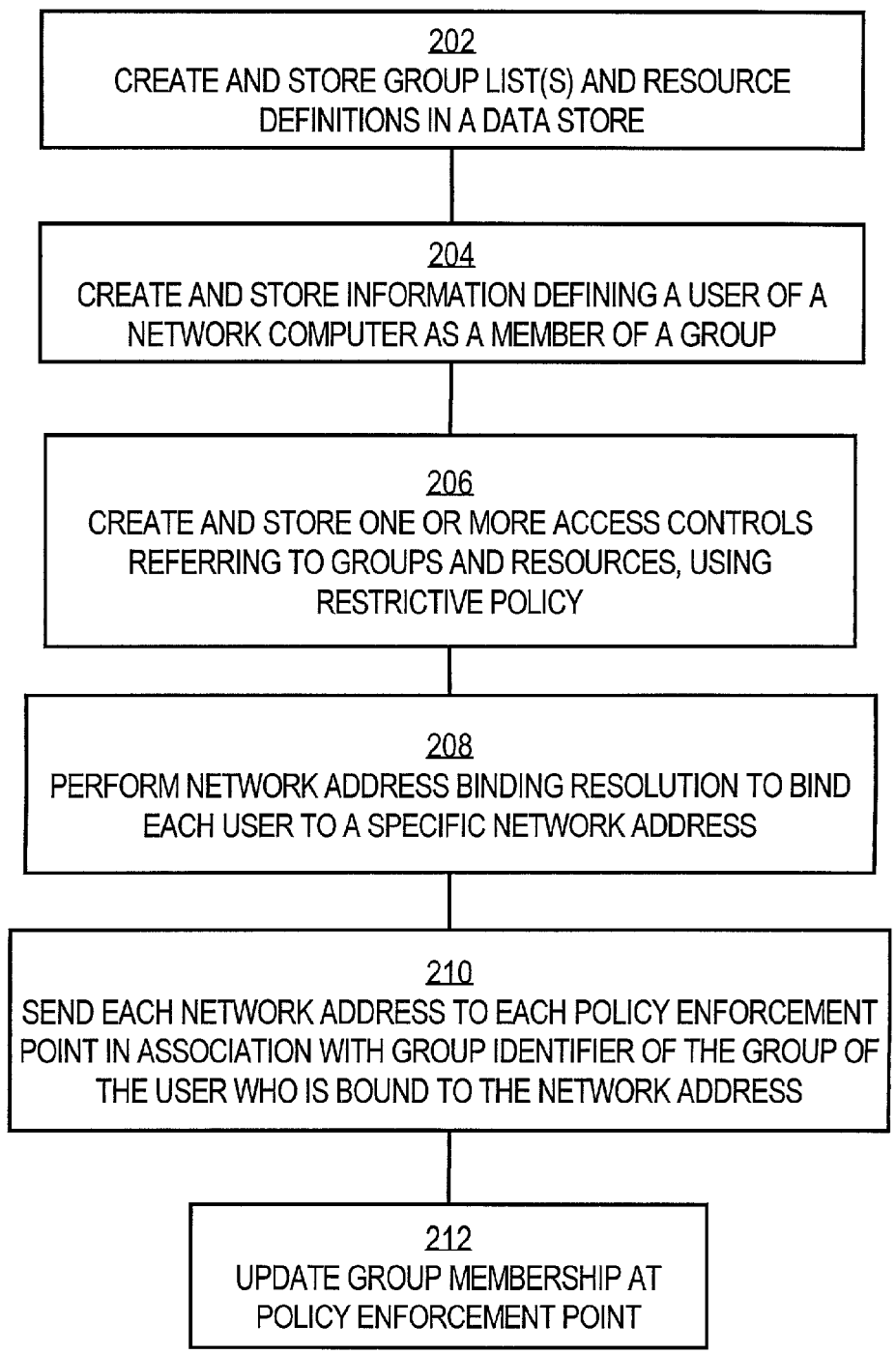
FIG. 2 is a flow diagram that illustrates steps of an example embodiment of a method of selectively enforcing network security policy using group identifiers.
Figure 3:
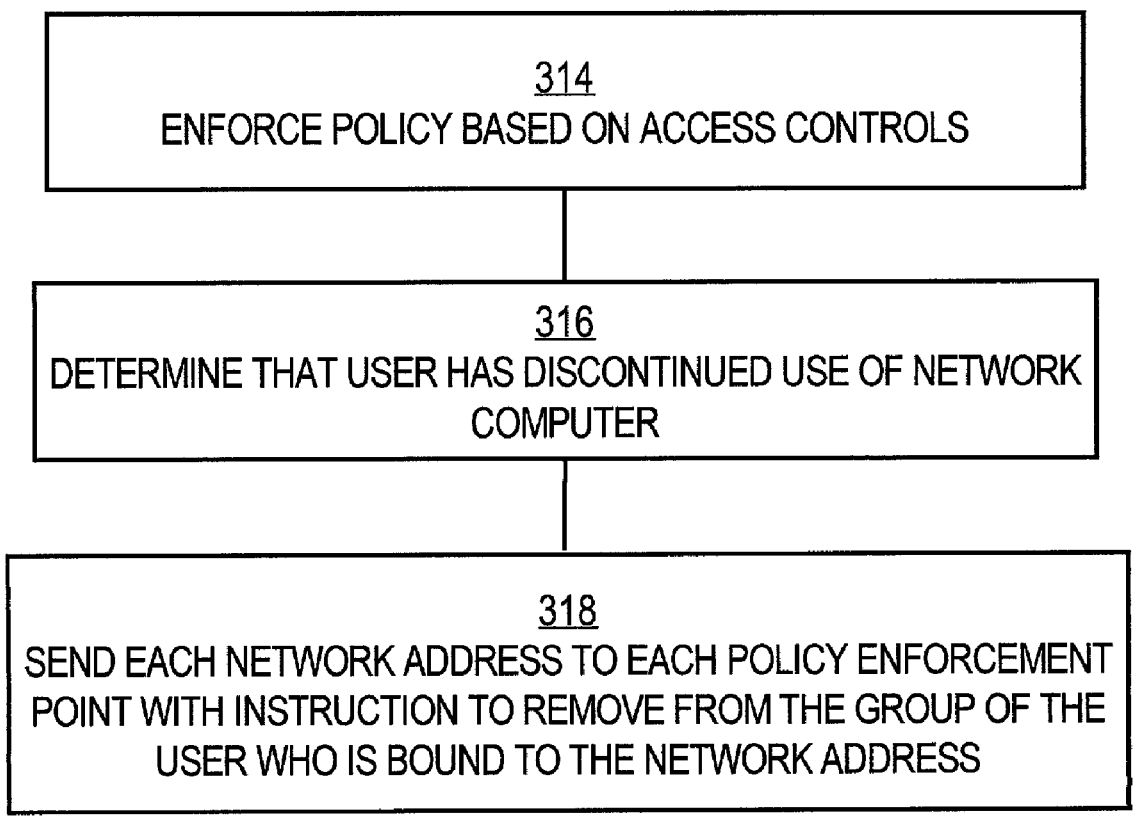
FIG. 3 is a flow diagram that illustrates further steps of an example embodiment of a method of selectively enforcing network security policy using group identifiers.

FIG. 2 and FIG. 3 are flow diagrams that illustrate steps of an example embodiment of a method of selectively enforcing network security policy using group identifiers. In general, the method involves defining a user of a network computer as a member of a group and placing the member, in association with the specific network address of the computer they are currently using, into a group to enforce a security policy that may limit the network resources to which the group may be permitted or denied network access.

In one embodiment, the processes of FIG. 2, FIG. 3 are implemented in the form of one or more software elements that are executed at each policy enforcement point of the network. For example, group membership management agent 140 may carry out the steps of FIG. 2, FIG. 3 using appropriate software instructions. In cooperation with such an agent, resolution of group membership occurs dynamically using an external service such as DNS, ASAP, etc., as described herein.

In general, the process of FIG. 2, FIG. 3 operates in conjunction with one or more access control lists that are defined in terms of an open template. The template may be abstracted to any desired degree. For example, the access control lists may have rules such as:

<group_A> is permitted to access Resource_A
<group_A> is permitted to access Resource_B
<group_A> is denied access to Resource_C.

The names and membership of groups such as <group_A> and resources such as Resource_A, Resource_B, and Resource_C are defined in a persistent data store that is managed by the software element that implements the processes of FIG. 2, FIG. 3.

Referring first to FIG. 2, in block 202, group lists and resource definitions are created and stored in a data store. For example, a network administrator creates group names and definitions, and resource definitions, in a stored list or database. The specific structure of the list or database is not critical, provided that there are records that identify each user and attributes of the user, including the group to which the user belongs. The list or database may be maintained for the exclusive use of this process, or the list or database may be shared among multiple applications. Examples of groups include Visitors, Contract Employees, Exempt Employees, Non-Exempt Employees, Engineering Department, HR Department, etc., including any other group name that is useful or meaningful to an enterprise.

In an embodiment, block 202 involves creating and storing group lists that comprise, for each group, a list of known IP addresses that correspond to machines of authorized users who are in the group. For example, if user "Bill" is known to have a home computer with a static IP address of "1.2.3.4," and "Bill" has been defined as a member of the group "Accountants" (e.g., in block 204, as described below), then the group list for "Accountants" will include the value "1.2.3.4." Alternatively, group lists may be defined as a list of usernames with null or empty values for corresponding network addresses. In this alternative, the network address corresponding to a particular group member is filled in when the user logs in and is authenticated, using a network address binding technique. In either alternative, updated groups of network addresses are periodically provided to policy enforcement points within a security zone or in another defined domain of the network.

Block 202 also involves defining each of the "Resources." In one embodiment, each "Resource" is treated as a single host. Each group of resources may resolve to a set of addresses for an IP network. Alternatively, a resource may be any set of machines that offer a particular service. For example, Resource_X may be all devices that have service_Y offered on TCP port_X. In a non-IP network, a "Resource" may be defined in alternative manner, for example, as a Banyan StreetTalk grouping.

In another alternative, block 202 involves the group membership management agent receiving information indicating that the group lists and resource definitions have been created and stored in a data store. In still another alternative, block 202 involves receiving and storing the group lists and resource definitions in a data store associated with the group membership management agent.

In block 204, information defining a user of a network computer as a member of a group is created and stored. For example, records are created and stored in the data store to indicate that user <Bob> is a member of the group <Accountants>. In another alternative, block 204 involves the group membership management agent receiving information indicating that the associations of users as members of groups have been created and stored in the data store. In still another alternative, block 204 involves receiving and storing mappings or associations of users to groups in a data store associated with the group membership management agent.

Block 202 and block 204 may be performed in inverse order.

Embodiments use the concept of the Network Address Binding Resolution (NABR) as described in several RFCs pertaining to development of the IETF Differentiated Services (diff-serv) protocol. In general, NABR is a mechanism that binds the network address of a machine to a properly authenticated user. The details of the binding are not critical; what is important is that the process results in creating and storing information that persistently associates a particular network address with a specific user. In this context, a network address that is bound to an authenticated user may comprise an IP address of the user's workstation, TCP or UDP port information, a MAC address, etc.

In one embodiment, prior to carrying out the NABR process and before NABR information is distributed in the network, each PEP denies all packets, or packets are permitted only from one or more trusted, default addresses. For example, a PEP may permit the group known as "visitors" to access the network and access a limited set of resources. In this case, if either the authentication mechanism or the authentication credentials fail then there would be no specific binding. The users who fall into this category would then be placed into the group known as "visitors" and would be extended the rights of that group.

In block 206, one or more access controls are created and stored. The access controls refer to groups and resources, in an abstract manner, and reflect a restrictive policy. For example, access controls are entered at a router using command line instructions in an abstracted form. For example, the CLI commands set forth in Table 1 are issued to a router, and show that the members of <group_A> are to be given access to the machines known as Resource_A, Resource_B, and Resource_C, but not to any other machine.

Table 1—Restrictive Group Access List Commands
access-list 101 permit host <group_A> host Resource_A any
access-list 101 permit host <group_A> host Resource_B any
access-list 101 permit host <group_A> host Resource_C any
access-list 101 deny host <group_A> any In an embodiment such as that of FIG. 1B, where group membership management agent 140 implements the foregoing process, block 206 involves creating the access control lists at the edge devices 120, 122, or communicating appropriate instructions to such devices to cause them to create the access control lists.

Referring now to block 208, network address binding resolution is carried out. As a result, an authenticated user is bound to a specific network address and the resulting binding is stored. Block 208 may be carried out, for example, at the time that a user logs into the network and is authenticated, or may be triggered by group membership management agent 140 in response to receiving information that a user has logged in. Block 208 may be carried out by an enhanced DNS server or another network element that can obtain records of authenticated users and associate them with network addresses of user machines or hosts, and that can maintain master group membership lists. Thus, when a particular user is authenticated in the network, block 208 involves determining what groups have that user as a member, through an NABR server, enhanced DNS server, etc. Binding information may be stored at such servers or separately in a directory or other persistent data store.

After network address binding resolution is carried out, the address of the workstation that has been bound to an authenticated user is added to the appropriate group at all PEPs. As shown in block 210, each network address of a binding is sent to each policy enforcement point, in association with a group identifier of the group of the user who is bound to the network address. For example, assume that a user identified as "Bill" is bound to IP address "A.A.A.A" using NABR. The NABR server examines the group lists that were created in block 202 and determines that "Bill" is a member of the group "Accountants." The process then communicates the address "A.A.A.A" to each of the PEPs with information indicating that the address belongs to the group "Accountants." As a result, resolution of the access control lists occurs dynamically.

The method by which the PEP becomes informed that a new authenticated user has entered the network using a particular host is not critical. As an example, an NABR server may send a COPS protocol message to a switch or router that acts as PEP. The COPS message informs the PEP that a new binding has been created, or acts as a request to add "A.A.A.A" to the members of the local list of the "Accountants" group that is stored at the PEP.

At each PEP, the abstracted access-control list would then contain one member for group_A. As shown by block 212, in response to receiving the network address and group identifier, a PEP updates its group membership information to add the specified network address to the group. Such updating may comprise adding the specified network address to the group identifier that is contained in an update request.

Alternatively, each PEP may maintain pre-defined group lists that include all known network addresses of all authorized group members. In this alternative, block 202 may involve creating and storing such lists. For example, each PEP may have a pre-defined group named "Accountants" that contains "A.A.A.A" and all other network addresses that are known for machines that are used by "Bill." In this alternative, block 210 may involve simply informing each PEP that "Bill" has been authenticated in the network at "A.A.A.A."

Further, the PEP may store an expiration time value or a time-to-live value in association with the network address in the group information. As described further herein, the expiration time values indicate when the associated network address should be removed from the group. Thus, the group information comprises a mapping that is maintained at the PEP and associates group names, network addresses of authenticated users, and information about when to delete the network address from the group.

Resolution of group membership may be carried out using DNS, or using the ASAP protocol that is currently undergoing development by IETF. Under ASAP, as group membership changes, agents that use the group information are notified nearly instantaneously. ASAP is a more tightly bound form of NABR than DNS, the principal difference being that ASAP clients accept notifications of group membership changes. Thus if the group <accountants> has 1000 members, then the ASAP process would inform the PEP that <Bill> is no longer an accountant, rather than the PEP having to query based on TTL information (as described below) that DNS uses. Either method, DNS or ASAP, is valid and may be used. Using these processes, resolution of the access lists occurs dynamically.

Referring now to FIG. 3, in block 314, a policy is enforced based on the established access controls. In an embodiment, security policy enforcement is carried out at each PEP based on the access controls that have been entered and group membership information stored at the PEP. For example, the packets coming from A.A.A.A are processed against the access control list definitions shown in Table 1.

It is known that the user will not stay actively engaged in the network over long periods of time. At most, a user will usually stay at the workstation for several hours. Accordingly, in block 316 the process determines that the user has discontinued use of its associated network computer. In response, in block 318 information about the user is deleted from the associated group at each PEP. For example, the network address to which the user is bound is sent to each PEP, with instructions to remove that user from the group of which the user is a member.

Thus, block 316 and block 318 provide a mechanism that will remove the network address that the user is using from the group either after periods of inactivity or after a set time limit. Thereafter, the user may carry out authentication and provide a NABR binding to be added to the group in the PEP again.

There are many potential ways to implement the process of block 316 and block 318 to provide a limited time period of permitted access to the PEP. For example, the process may interact with a database similar to those used with DNS servers. Associated with each record in the database is Time To Live (TTL) information. The definition of the TTL information or associated timers is not critical. For example, block 316 and block 318 may involve removing a member from a group if there has been no activity from that member during a time-out period, or the member may be removed from a group after a pre-selected amount of time even if there is still activity.

Thus, a method is provided for managing access to a network that precludes the need for establishing access control lists that identify specific individuals or network addresses. Access control lists that could be applied to individuals would create severe problems if implemented in a network, because such an approach would entail the transfer of access control lists for each individual that would create a sizeable amount of traffic, and the use of a large amount of memory to store all of the access-control elements for those individuals.

In contrast, according to an embodiment, an abstracted network security policy for each group can be written and maintained in one place, or in a place convenient to distribution. Users are bound to the policy of their group and not just an IP address that can be used by any user. As a result, address space is conserved. Further, a group security policy can be granularly applied to individuals as they are identified as belonging to any specific group and also coarsely to unauthenticated users of any machines.

In another embodiment, users are not bound to machines are not created and stored. Instead, resources within a defined security zone are bound to hosts that have the resources. When an authenticated user enters the network, the user is permitted to access any host in the security zone until the user attempts to access a protected resource. At that time, an NABR process is triggered, and the user is bound to a particular network address. The system then examines the address, determines the group(s) of which the user is a member, determines whether that group is permitted to access the requested resource, and allows the user to access the requested resource only if the group is authorized to access the requested resource.

Figure 4A:
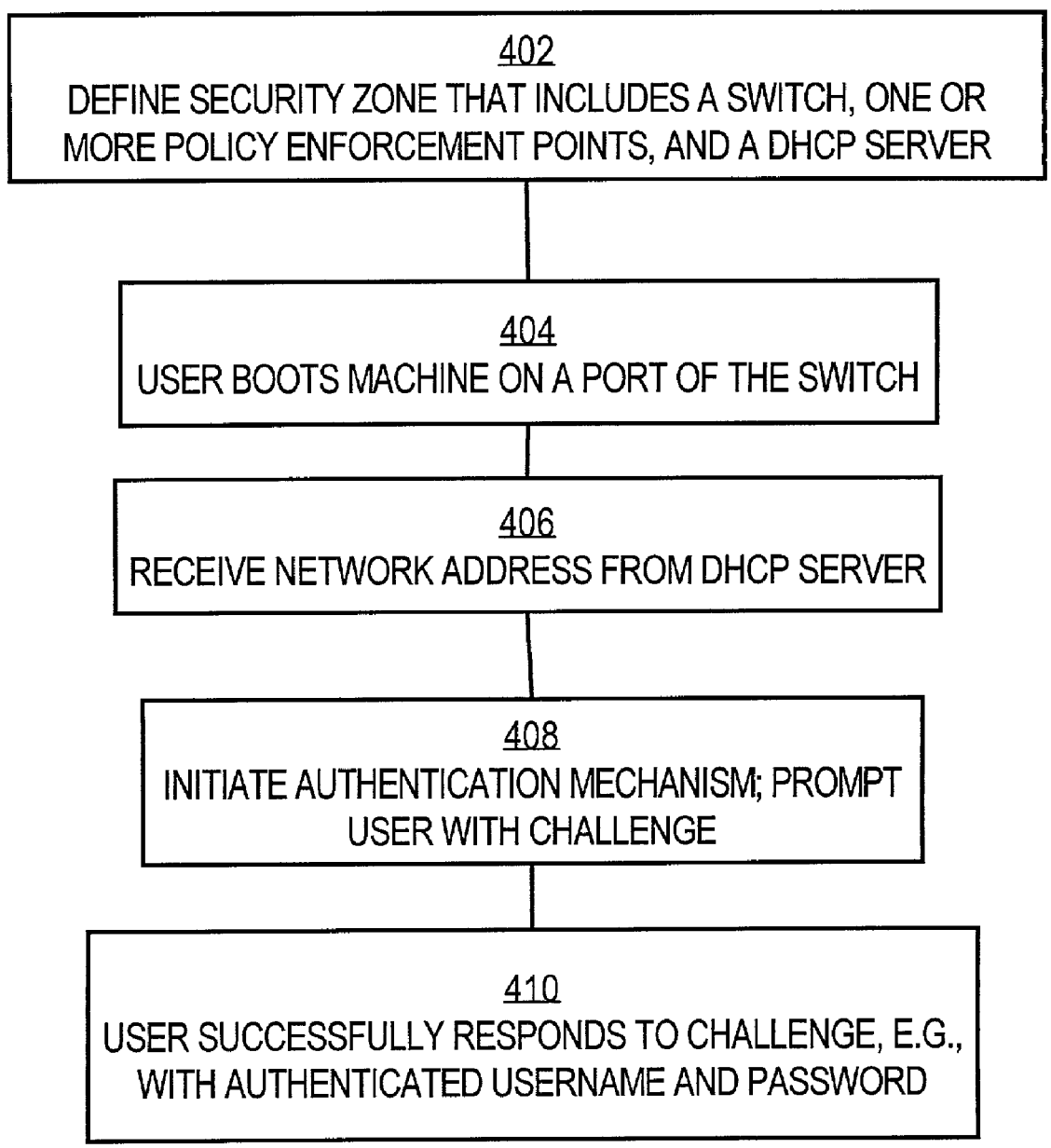
FIG. 4A is a flow diagram of operational steps that may be carried out in one example implementation of the process of FIG. 2, FIG. 3.
Figure 4B:
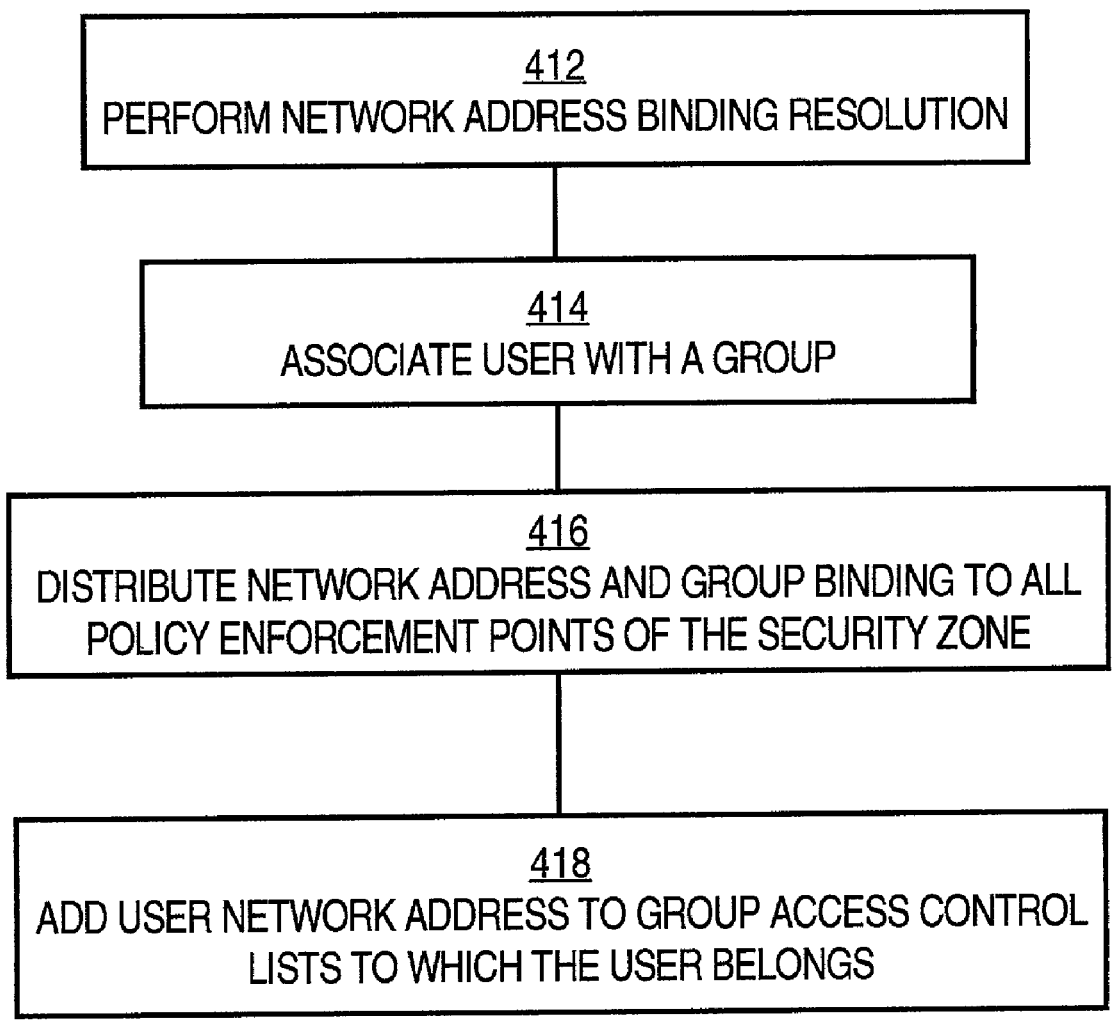
FIG. 4B is a flow diagram of further operational steps in the process of FIG. 4A.

FIG. 4A, FIG. 4B are flow diagrams of operational steps that may be carried out in one example implementation of the process of FIG. 2, FIG. 3.

In block 402, a security zone is defined, e.g., by an administrator. The security zone is a logical association of network devices that represent a secured domain. For example, a typical security zone includes a switch, a known set of PEPs, and a DHCP server. The definition of a security zone is determined by a security administrator with reference to an access policy for each network area. In logical terms, a security zone is a network area bounded by a perimeter of security or policy enforcement devices. Physically, a security zone may consist of the network in a computer room, the network of a floor of a building that contains client machines, all of the networks in a building, all of the networks in an enterprise, etc.

A security zone also may be defined logically in terms of trust levels. A security zone defined as a building may have an access policy where no one but trusted employees are allowed, and that is enforced with security passes or human guards. Although there may be a PEP at the intersection of each of the LANs in that building, e.g., a router, there is an identical level of trust between such LANs. Accordingly, each user may be placed into any group VLAN. A boundary of the security zone would be at the intersection of the building LANs and the WAN links.

Enforcement of the security zone is performed by the PEPs that are identified to protect the perimeter. In general, such PEPs do not allow flows, sessions or conversations without prior authentication and authorization. Specifically, packets are examined at the PEP. If the packets come from an authenticated device, such as a client machine where the group and address binding has been accepted by the PEP, then the packets will be processed against the policy. If the packets come from a source that has not been authenticated, then they are immediately dropped. The PEP may log such occurrences.

Maintaining the integrity of the security zone is important. In particular, vigilance must be exercised when creating any new paths that could bypass the policy enforcement devices. One way to do this entails a proactive internal assessment of the paths available to egress the security zone. Additionally, an external assessment of the paths available for ingress may help. While these methods would find any commonly available devices that may bypass the PEPs, individual users may still be able bypass the policy through the use of covert channels, or through the use of collusion with an outside partner. These channels may be addressed by the security administrator using other, more stringent mechanisms.

Referring again to FIG. 4A, in block 404, a user boots a machine on a port on a switch. In response, the DHCP server gives the machine a network address, as shown by block 406. In block 408, an authentication mechanism is initiated and the user is prompted with a challenge. In block 410, the user successfully completes the challenge by providing an authenticated username and password.

Upon successful authentication, an authentication server that is responsible for processing authentication informs a policy server that an authenticated user has entered the network. In response, referring now to FIG. 4B, in block 412, network address binding resolution is carried out. Further, as shown by block 414, the user is associated with a group.

In block 416, the network address and group binding is distributed to all policy enforcement points of the security zone. Thus, once the IP address of the user's machine is associated with a group, then COPS or any other policy distribution protocol is used to load that the network address and group binding into all of the PEPs that bound that security zone.

Referring again to block 408 and block 410, if the authentication mechanism is canceled by the user, then a default policy is applied. If the authentication mechanism fails, then the machine associated with the user is placed into a group that has no network accesses beyond the current security zone.

In block 418, the network address of the user is added to the group to which the user belongs, at each of the PEPs. Thus, each of the PEPs adds the user's address to the group ACLs to which that particular person belongs.

In this way, the abstracted access control list is applied to the first point and all points that may be used for resiliency that the user must pass. It is important that all boundary PEPs must be able to implement the security policy.

Related Network Security Issues

There are known ways to bypass the controls implemented on network control points, and there are known weaknesses in the way that the controls are implemented. This does not mean that the controls are flawed; they do process packets in the way they are designed, but they are constrained by inherent deficiencies of IP and associated protocols. Some of these problems are now described.

GRANULARITY. On a multi-user system, the session of one user cannot be granted while denying a similar session of another user. Neither the router nor the PIX can always identify the authorized session from a non-authorized session based upon a simple binding of user and network address. A related problem arises in the context of one-at-a-time platforms such as Microsoft Windows NT Workstation. In this case, even though the platform can accommodate multiple users, only a single user can use the machine at a time. Access lists cannot be predefined for all users that may use that machine. Additionally, for the case of URT, the first user may establish the machine into an appropriate VLAN, but then subsequent users would have the same privileges as the first user. A special case of this would be where a person logged in with a normal account, and later logged out. Subsequently that same person logged in with the administrator account. The same access controls should not apply to the same person having a different persona.

INSTANTIATION. Access controls are based upon known and usually static addresses. DHCP and dial-in pools can complicate the use of on these types of controls. There are mechanisms to bind a user with an address for the duration of a session, or groups of sessions but these require an authentication mechanism.

TRANSIENCE. Transience involves bypassing the intent of the policy by first accessing an accessible machine that is permitted a specific policy. For example, assume that a policy states that a user "Bill" must not have access to a particular resource. The policy is implemented by establishing an access control that denies the machine that Bill is using from having telnet access to the protected machine. However, the access control can be bypassed if Bill first telnets to another machine, and then establishes a telnet session permitted from the second machine to the desired resource.

TUNNELING. Embedding the IP datagram within a GRE tunnel, within RSRB, within IP-within-IP, or encrypting it will circumvent port-based controls, as such controls do not look into the contents of these types of packets.

Additionally, collusion to utilize non-standard ports may bypass a policy.

The authorization credentials that are used to bind a user with a network identifiable token vary greatly across all security devices. The token most often used comprises the source and/or destination IP addresses. Devices that purport to be more secure claim that a user authentication, typically consisting of userid and password information, is required before network activities are permitted. At the highest level, the network activity is self-authenticating and maintains its own integrity. Examples of each of these are:

for IP address access: ACLs on a router that statically permit or deny packets based upon information in the packet header.

for userid/password: Many types of firewalls will require a telnet session (or http, ftp, or other) for in-stream authentication. The authentication merely binds the address to a user and permits further activity from that address even to the extent of allowing other application conversations for that same IP address.

for self-authentication and integrity: SOCKS.

Hardware Overview

Figure 5:
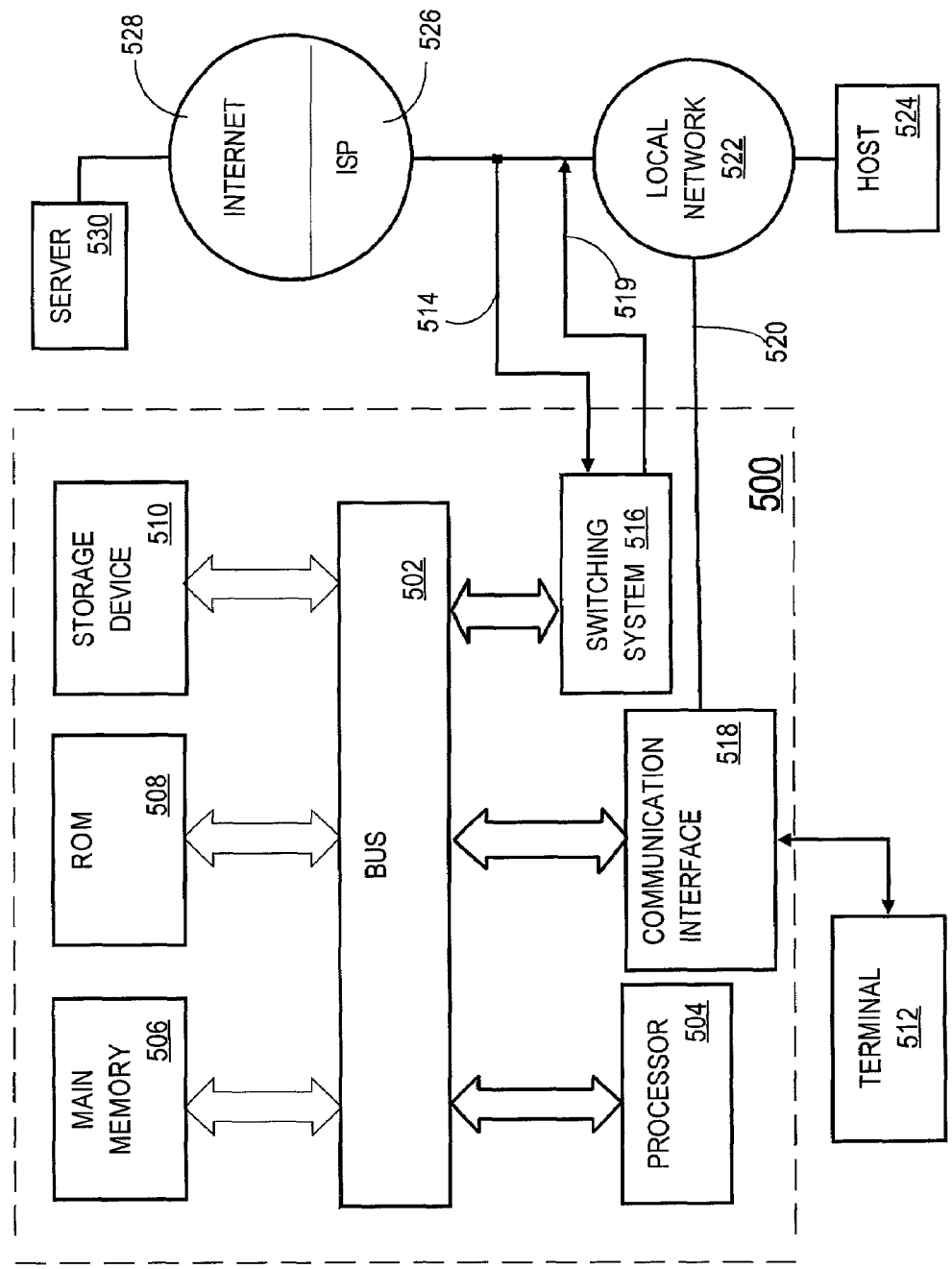
FIG. 5 is a block diagram that illustrates a computer system such as a router or switch upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

An communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for communicating network quality of service policy information to a plurality of policy enforcement points. According to one embodiment of the invention, communicating network quality of service policy information to a plurality of policy enforcement points is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared sign al. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for communicating network quality of service policy information to a plurality of policy enforcement points.

The received code may be executed by processor 504 as it is received, and/or stored in storage device 510, or other non-volatile storage for later execution. In this manner, computer system 500 may obtain application code in the form of a carrier wave.

CONCLUSIONS

Accordingly, a method and apparatus for selectively enforcing network security policy using group identifiers has been disclosed. The method described herein provides improvements over prior approaches, such as policy enforcement using TACACS+. In TACACS+, a full policy is sent to a PEP after authentication. In embodiments disclosed herein, an abstracted version of the policy is already placed on each of the PEPs and only the information pertaining to the authenticated user is sent to each PEP for correct enforcement. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of selectively enforcing a security policy in a network, the method comprising the computer-implemented steps of:

receiving information defining one or more group lists, resource definitions, and definitions of users as members of one or more groups in the group lists, wherein the definitions include network addresses for the users, wherein the network addresses have been assigned by an address server;

creating and storing one or more access controls in a policy enforcement point device that controls access of clients to the network, wherein each of the access controls specifies that a named abstract group is allowed access to a particular resource;

receiving, from an external binding process separate from the address server, a binding of a network address to an authenticated user of one of the clients for which the policy enforcement point controls access to the network;

updating the named group to include the bound network address of the authenticated user at the policy enforcement point; and permitting a packet flow originating from the network address to pass from the policy enforcement point into the network only if the network address is in the named group identified in one of the access controls that specifies that the named group is allowed access to the network.

2. A method as recited in claim 1, wherein the steps of creating and storing one or more access controls in a policy enforcement point that controls access to the network comprise the steps of:

creating and storing one or more definitions of groups in a data store;

creating and storing one or more definitions of resources within a data store;

creating and storing one or more access controls at the policy enforcement point, wherein each of the access controls specifies that a named group is allowed access to a particular resource, and wherein one of the access controls specifies that all other traffic is denied access to the network.

3. A method as recited in claim 1, further comprising the steps of distributing the network address of the authenticated user and information identifying one or more groups of which the authenticated user is a member to all policy enforcement points of a protected network that the user seeks to access.

4. A method as recited in claim 1, further comprising the steps of distributing the network address of the authenticated user and information identifying one or more groups of which the authenticated user is a member to all policy enforcement points that define a security zone that encompasses the user.

5. A method as recited in claim 1, wherein the steps of receiving a binding of a network address to an authenticated user of a client for which the policy enforcement point controls access to the network comprises the steps of receiving an Internet Protocol (IP) address for the user from a network address binding resolution (NABR) process.

6. A method as recited in claim 1, further comprising the steps of determining that the user has discontinued use of the client, and deleting the network address to which the user is bound from each named group of each policy enforcement point of the network.

7. A method as recited in claim 1, wherein the steps of receiving a binding of a network address to an authenticated user of a client for which the policy enforcement point controls access to the network comprises the steps of receiving an Internet Protocol (IP) address for the user from an ASAP protocol process.

8. A method as recited in claim 1, wherein the steps of receiving a binding of a network address to an authenticated user of a client for which the policy enforcement point controls access to the network comprises the steps of receiving an Internet Protocol (IP) address for the user from a DNS process.

9. A computer-readable medium carrying one or more sequences of instructions for selectively enforcing a security policy in a network, which instructions, when executed by one or more processors, cause the one or more processors to carry out the steps of:
receiving information defining one or more group lists, resource definitions, and definitions of users as members of one or more groups in the group lists, wherein the definitions include network addresses for the users, wherein the network addresses have been assigned by an address server;
creating and storing one or more access controls in a policy enforcement point device that controls access of clients to the network, wherein each of the access controls specifies that a named abstract group is allowed access to a particular resource;
receiving, from an external binding process separate from the address server, a binding of a network address to an authenticated user of one of the clients for which the policy enforcement point controls access to the network;
updating the named group to include the bound network address of the authenticated user at the policy enforcement point; and
permitting a packet flow originating from the network address to pass from the policy enforcement point into the network only if the network address is in the named group identified in one of the access controls that specifies that the named group is allowed access to the network.

10. A computer-readable medium as recited in claim 9, wherein the instructions for carrying out the steps of creating and storing one or more access controls in a policy enforcement point that controls access to the network comprise instructions for carrying out the steps of:
creating and storing one or more definitions of groups in a data store;
creating and storing one or more definitions of resources within a data store;
creating and storing one or more access controls at the policy enforcement point, wherein each of the access controls specifies that a named group is allowed access to a particular resource, and wherein one of the access controls specifies that all other traffic is denied access to the network.

11. A computer-readable medium as recited in claim 9, further comprising instructions which, when executed by the one or more processors, cause the one or more processors to carry out the steps of distributing the network address of the authenticated user and information identifying one or more groups of which the authenticated user is a member to all policy enforcement points of a protected network that the user seeks to access.

12. A computer-readable medium as recited in claim 9, further comprising instructions which, when executed by the one or more processors, cause the one or more processors to carry out the steps of distributing the network address of the authenticated user and information identifying one or more groups of which the authenticated user is a member to all policy enforcement points that define a security zone that encompasses the user.

13. A computer-readable medium as recited in claim 9, wherein the instructions for carrying out the steps of receiving a binding of a network address to an authenticated user of a client for which the policy enforcement point controls access to the network comprise instructions for carrying out the steps of performing network address binding resolution for the user.

14. A computer-readable medium as recited in claim 9, further comprising instructions which, when executed by the one or more processors, cause the one or more processors to carry out the steps of determining that the user has discontinued use of the client, and deleting the network address to which the user is bound from each named group of each policy enforcement point of the network.

15. An apparatus for selectively enforcing a security policy in a network, comprising:
means for receiving information defining one or more group lists, resource definitions, and definitions of users as members of one or more groups in the group lists, wherein the definitions include network addresses for the users, wherein the network addresses have been assigned by an address server;
means for creating and storing one or more access controls in a policy enforcement point device that controls access of clients to the network, wherein each of the access controls specifies that a named abstract group is allowed access to a particular resource;
means for receiving, from an external binding process separate from the address server, a binding of a network address to an authenticated user of one of the clients for which the policy enforcement point controls access to the network;
means for updating the named group to include the bound network address of the authenticated user at the policy enforcement point; and
means for permitting a packet flow originating from the network address to pass from the policy enforcement point into the network only if the network address is in the named group identified in one of the access controls that specifies that the named group is allowed access to the network.

16. An apparatus for selectively enforcing a security policy in a network, comprising:

a network interface that is coupled to the data network for receiving one or more packet flows therefrom;

a processor;

one or more stored sequences of instructions which, when executed by the processor, cause the processor to carry out the steps of:

receiving information defining one or more group lists, resource definitions, and definitions of users as members of one or more groups in the group lists, wherein the definitions include network addresses for the users, wherein the network addresses have been assigned by an address server;

creating and storing one or more access controls in a policy enforcement point device that controls access of clients to the network, wherein each of the access controls specifies that a named abstract group is allowed access to a particular resource;

receiving, from an external binding process separate from the address server, a binding of a network address to an authenticated user of one of the clients for which the policy enforcement point controls access to the network;

updating the named group to include the bound network address of the authenticated user at the policy enforcement point; and permitting a packet flow originating from the network address to pass from the policy enforcement point into the network only if the network address is in the named group identified in one of the access controls that specifies that the named group is allowed access to the network.

17. A method of selectively enforcing a security policy in a network, the method comprising the computer-implemented steps of:

receiving information defining one or more group lists, resource definitions, and definitions of users as members of one or more groups in the group lists, wherein the definitions include network addresses for the users, wherein the network addresses have been assigned by an address server;

creating and storing one or more access control list entries in a network router that acts as a policy enforcement point device and that controls access of clients to the network, wherein each of the access control list entries specifies that a named group of users is allowed or refused access to a particular network resource;

creating and storing one or more definitions of the named groups in a data store that is accessible by the network router;

receiving, from an external process that can bind a user to a specific network address and that is separate from the address server, a binding of a network address to an authenticated user of one of the clients for which the router controls access to the network;

updating the named group to include the bound network address of the authenticated user at the policy enforcement point; and permitting a packet flow originating from the bound network address to pass from the policy enforcement point into the network only if the bound network address is in the named group identified in one of the access control list entries that specifies that the named group is allowed access to the network.

18. A method of selectively enforcing a security policy in a network, the method comprising the computer-implemented steps of:

receiving information defining one or more group lists, resource definitions, and definitions of users as members of one or more groups in the group lists, wherein the definitions include network addresses for the users, wherein the network addresses have been assigned by an address server;

creating and storing one or more access control list entries in a network router that acts as a policy enforcement point device and that controls access of clients to the network, wherein each of the access control list entries specifies that a named group of users is allowed or refused access to a particular network resource;

creating and storing one or more definitions of the named groups in a data store that is accessible by the network router;

receiving, from an external process that can bind a user to a specific network address and that is separate from the address server, a binding of a network address to an authenticated user of one of the clients for which the router controls access to the network;

updating the named group to include the bound network address of the authenticated user at the policy enforcement point;

permitting a packet flow originating from the bound network address to pass from the policy enforcement point into the network only if the bound network address is in the named group identified in one of the access control list entries that specifies that the named group is allowed access to the network; and distributing the network address of the authenticated user and information identifying one or more groups of which the authenticated user is a member to all policy enforcement points that define a security zone that encompasses the user;

determining that the user has discontinued use of the client, and deleting the network address to which the user is bound from each named group of each policy enforcement point of the network.

* * * * *